United States Patent
Holzapfel et al.

(10) Patent No.: US 9,863,791 B2
(45) Date of Patent: Jan. 9, 2018

(54) OPTICAL POSITION-MEASURING DEVICE HAVING INCREMENTAL DETECTOR AND ABSOLUTE DETECTOR DISPOSED IN A COMMON DETECTION PLANE AT A DEFINED PERPENDICULAR DISTANCE FROM A SCANNING GRATING

(71) Applicant: DR. JOHANNES HEIDENHAIN GmbH, Traunreut (DE)

(72) Inventors: Wolfgang Holzapfel, Obing (DE);
Christoph Lingk, Traunstein (DE);
Johannes Trautner, Traunwalchen (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 43 days.

(21) Appl. No.: 15/232,830

(22) Filed: Aug. 10, 2016

(65) Prior Publication Data
US 2017/0059368 A1 Mar. 2, 2017

(30) Foreign Application Priority Data
Aug. 26, 2015 (DE) ........................ 10 2015 216 268

(51) Int. Cl.
*G01D 5/347* (2006.01)
*G01D 5/244* (2006.01)

(52) U.S. Cl.
CPC ..... *G01D 5/34776* (2013.01); *G01D 5/24438* (2013.01); *G01D 5/34784* (2013.01)

(58) Field of Classification Search
CPC ........... G01D 5/24438; G01D 5/34776; G01D 5/34784

(Continued)

(56) References Cited

U.S. PATENT DOCUMENTS 5,235,181 A    8/1993 Durana et al.
6,229,140 B1 *  5/2001 Ishizuka ............. G01D 5/2457
                                              250/231.18

(Continued)

FOREIGN PATENT DOCUMENTS

EP     1014034 A2    6/2000
EP     1043571 A1    10/2000

OTHER PUBLICATIONS

R. M. Pettigrew, "Analysis Of Grating Imaging And Its Application To Displacement Metrology", SPIE Proceedings vol. 0136: 1st Euroropean Conf on Optics Applied to Metrology, pp. 1-8, Apr. 18, 1978.

*Primary Examiner* — Que T Le
(74) *Attorney, Agent, or Firm* — Leydig, Voigt & Mayer, Ltd.

(57) ABSTRACT

An optical position-measuring device for absolute position determination includes a material measure extending along a measurement direction and including an incremental graduation and an absolute code. A scanning unit movable relative to the material measure has a light source, a scanning grating for optically scanning the incremental graduation and a detector device. The detector device includes an incremental detector for generating incremental signals from the optical scanning of the incremental graduation and an absolute detector for generating absolute signals from optical scanning of the absolute code. A common detection plane is located at a defined perpendicular distance from the scanning grating and/or a periodicity of a fringe pattern on the incremental detector is selected such that, in the event of scattering contamination in a region of the material measure and/or the scanning grating, amplitudes of the incremental signals and the absolute signals drop off equally.

15 Claims, 3 Drawing Sheets

(58) Field of Classification Search
USPC .......................................... 250/231.13, 231.18
See application file for complete search history.

(56) References Cited

U.S. PATENT DOCUMENTS

| | | |
|---|---|---|
| 6,486,467 B1 | 11/2002 | Speckbacher et al. |
| 2007/0187583 A1 | 8/2007 | Yaku et al. |
| 2012/0085897 A1 | 4/2012 | Kato |

* cited by examiner

OPTICAL POSITION-MEASURING DEVICE HAVING INCREMENTAL DETECTOR AND ABSOLUTE DETECTOR DISPOSED IN A COMMON DETECTION PLANE AT A DEFINED PERPENDICULAR DISTANCE FROM A SCANNING GRATING

CROSS-REFERENCE TO PRIOR APPLICATION

Priority is claimed to German Patent Application No. DE 10 2015 216 268.0, filed on Aug. 26, 2015, the entire disclosure of which is hereby incorporated by reference herein.

FIELD

The present invention relates to an optical position-measuring suitable for high-accuracy absolute position determination.

BACKGROUND

An absolute optical position-measuring device of this type is known, for example, from U.S. Pat. No. 5,235,181. The position-measuring device described therein has a material measure extending along a measurement direction and having an incremental graduation as well as an absolute code. A scanning unit is movable relative to the material measure along the measurement direction. The scanning unit has a light source, a scanning grating for optically scanning the incremental graduation, as well as a detector device. The detector device includes an incremental detector for generating incremental signals from the optical scanning of the incremental graduation, as well as an absolute detector for generating absolute signals from the optical scanning of the absolute code. The exact absolute position of the scanning unit relative to the material measure can be determined by combining the absolute signals and the incremental signals.

Such position-measuring devices are used, for example, in applications where, in a machine, the position of a movable machine part relative to a stationary machine part must be determined with high accuracy to enable a machine controller to accurately position these machine parts relative to each other. If these machines are, for example, machine tools, then the conditions under which the optical position-measuring device is operated may impair the proper functioning thereof. For example, it is possible that contaminants, such as coolant/lubricants or oil mists, may accumulate on optical components of the position-measuring device, in particular on the material measure, which may take the form of a glass scale. In the extreme case, this can result in failure of the position-measuring device. In order to prevent such contamination-related failures, various protective measures have been described for optical position-measuring devices to minimize the likelihood of occurrence of such contamination. Examples of such measures include the encapsulation of the material measure with a surrounding profiled member, flushing of the profiled member with compressed air, installing filters in compressed-air units, etc. However, contamination of optical components of the position-measuring device as a result of such influences, and impairment of the proper functioning of the position-measuring device cannot always be prevented in this way.

SUMMARY

In an embodiment, the present invention provides an optical position-measuring device for absolute position determination. A material measure extends along a measurement direction and includes at least one incremental graduation and an absolute code. A scanning unit is movable relative to the material measure along the measurement direction. The scanning unit has a light source, a scanning grating for optically scanning the incremental graduation and a detector device. The detector device includes an incremental detector configured to generate incremental signals from the optical scanning of the incremental graduation and an absolute detector configured to generate absolute signals from optical scanning of the absolute code. The incremental detector and the absolute detector are disposed in a common detection plane. The detection plane is located at a defined perpendicular distance from the scanning grating and/or a periodicity of a fringe pattern on the incremental detector is selected such that, in the event of scattering contamination in a region of the material measure and/or the scanning grating, amplitudes of the incremental signals and amplitudes of the absolute signals drop off equally.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides an optical position-measuring device for absolute position determination that makes the optical scanning of a material measure as insensitive as possible to contamination and ensures reliable generation of position signals, even in the event of possible contamination of optical components.

An embodiment of the inventive optical position-measuring device for absolute position determination includes a material measure extending along a measurement direction and having at least one incremental graduation and an absolute code, as well as a scanning unit which is movable relative to the material measure along the measurement direction and includes a light source, a scanning grating for optically scanning the incremental graduation, as well as a detector device. The detector device has an incremental detector for generating incremental signals from the optical scanning of the incremental graduation, as well as an absolute detector for generating absolute signals from the optical scanning of the absolute code. The incremental detector and the absolute detector are disposed in a common detection plane. The detection plane is located at a defined perpendicular distance (v) from the scanning grating and/or the periodicity of a fringe pattern on the incremental detector is selected such that, in the event of scattering contamination in the region of the material measure and/or scanning grating, the amplitudes of the incremental signals and the amplitudes of the absolute signals drop off equally.

In a possible embodiment, the perpendicular distance between the scanning grating and the detection plane is selected either in accordance with $$v = u \cdot \frac{\left(\frac{1}{d_1} - \frac{1}{2 \cdot d_{ABS}}\right)}{\left(\frac{1}{d_3} + \frac{1}{2 \cdot d_{ABS}}\right)} \pm 10\%$$

or in accordance with $$v = u \cdot \frac{\left(\frac{1}{d_1} + \frac{1}{2 \cdot d_{ABS}}\right)}{\left(\frac{1}{d_3} - \frac{1}{2 \cdot d_{ABS}}\right)} \pm 10\%$$

where:
v:=perpendicular distance between the scanning grating and the detection plane
u:=perpendicular distance between the material measure and the scanning grating
$d_1$:=grating period of the incremental graduation on the material measure
$d_3$:=periodicity of the fringe pattern on the incremental detector
$d_{ABS}$:=width of the smallest structure of the absolute code in the measurement direction.

In another embodiment, the periodicity of the fringe pattern on the incremental detector may be selected in accordance with $$d_3 = 2 \cdot d_{ABS} \pm 10\%$$

where:
$d_3$:=periodicity of the fringe pattern on the incremental detector
$d_{ABS}$:=width of the smallest structure of the absolute code in the measurement direction.

Alternatively, the perpendicular distance (v) between the scanning grating and the detection plane may also be selected in accordance with $$v = \frac{1}{2} u \cdot d_3 \cdot \left(\frac{1}{d_1} - \frac{1}{2 \cdot d_{ABS}}\right) \pm 10\%$$

where:
v:=perpendicular distance between the scanning grating and the detection plane
u:=perpendicular distance between the material measure and the scanning grating
$d_1$:=grating period of the incremental graduation on the material measure
$d_3$:=periodicity of the fringe pattern on the incremental detector
$d_{ABS}$:=width of the smallest structure of the absolute code in the measurement direction The optical scanning of the incremental graduation is advantageously based on a three-grating scanning principle, where the first illuminated grating in the scanning beam path is the incremental graduation, the second illuminated grating is the scanning grating, and the third illuminated grating is the incremental detector, which takes the form of a structured detector.

It may be provided for the optical scanning of the absolute code to be based on a shadow-casting principle, where the structures of the absolute code are projected onto the absolute detector in the detection plane without any optical imaging elements being interposed therebetween.

In this connection, the absolute code may be in the form of a pseudo-random code.

In a possible embodiment, the material measure takes the form of a transmission-type material measure where both the incremental graduation and the absolute code each have alternately arranged regions of different transmission characteristics.

It has proved advantageous to select the distance between the facing sides of the material measure and the scanning unit to be less than or equal to 50 μm.

Preferably, the scanning unit includes a single light source for illuminating the incremental graduation and the absolute code.

Moreover, a control unit may be provided to control the output intensity of the light source as a function of the signal amplitudes of the periodic incremental signals and in such a way that a predetermined signal amplitude is obtained for the periodic incremental signals at all times.

It has also proved advantageous to dispose the incremental detector and the absolute detector together on a detector chip.

Furthermore, a transparent filler medium having a refractive index of n>1 may be disposed at least in a portion of the space between the scanning grating and the detector device.

Moreover, the scanning grating may be disposed within the filler medium.

A substantial advantage provided by an embodiment of the present invention is that it makes the optical scanning of the material measure particularly insensitive to contamination. The insensitivity, in particular insensitivity to scattering contamination, that can be ensured goes beyond the insensitivity to contamination achieved by the known mechanical protective measures. The term "scattering contamination" as used herein is understood to refer to those contaminations which, at least locally, change the propagation direction of light. The insensitivity can be achieved using a simple and economical optical scanning system that does not require any expensive components such as, for example, imaging lenses. Thus, the availability of optical position-measuring devices can be significantly increased, even under critical conditions.

In certain applications, it is even possible to dispense with some of the mechanical protective measures mentioned above, which may result in significant cost advantages for the optical position-measuring device according to the present invention.

Figure 1:
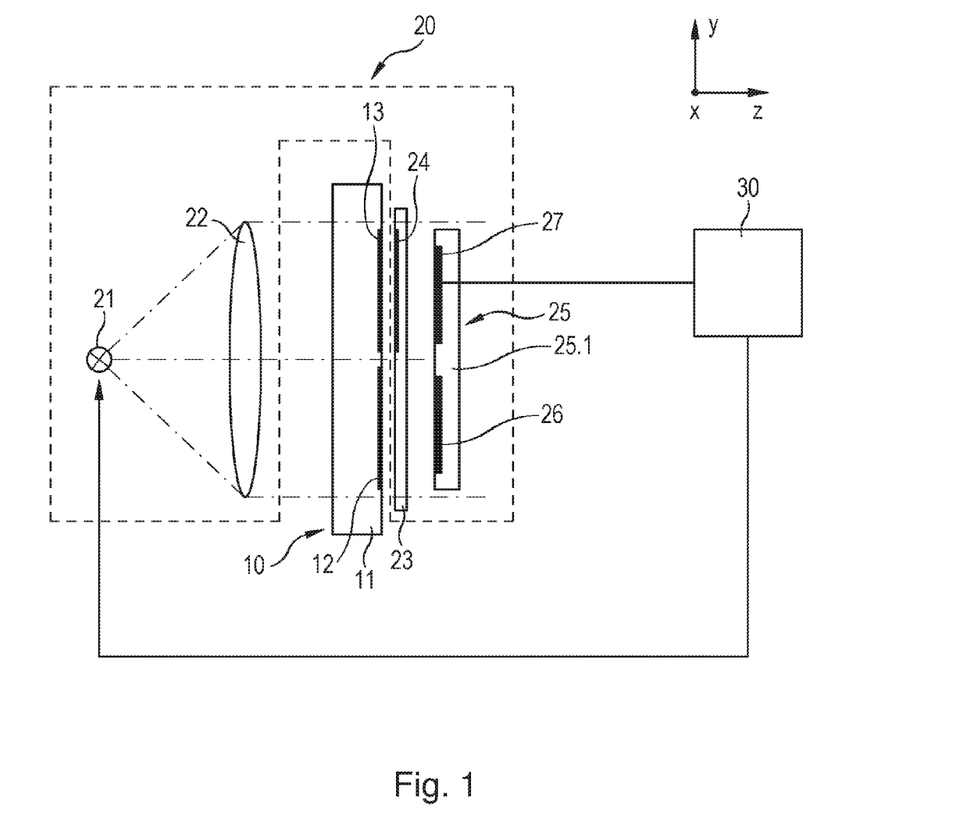
FIG. 1 is a schematic cross-sectional view of a first exemplary embodiment of the optical position-measuring device according to the present invention.
Figures 2A, 2B:
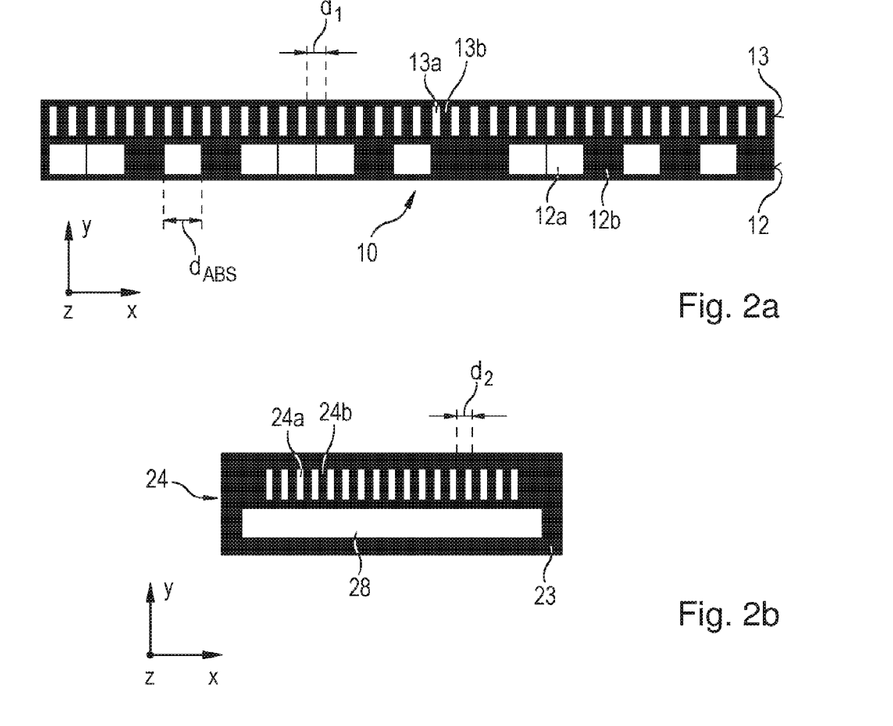
FIG. 2a is a plan view of the material measure of the first exemplary embodiment of FIG. 1.
FIG. 2b is a plan view of the scanning reticle of the first exemplary embodiment of FIG. 1.
Figure 2C:
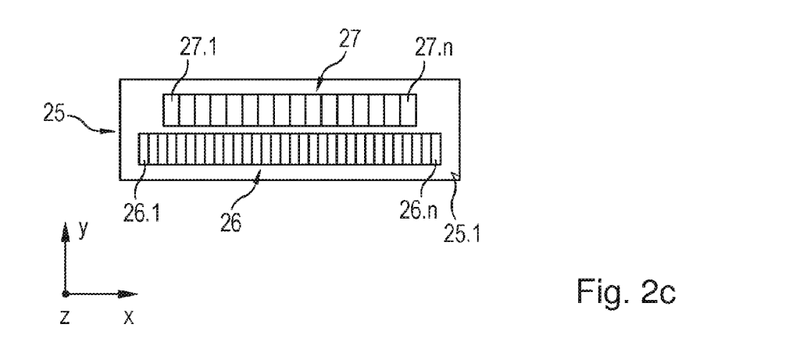
FIG. 2c is a plan view of the detector device of the first exemplary embodiment of FIG. 1.
Figure 3:
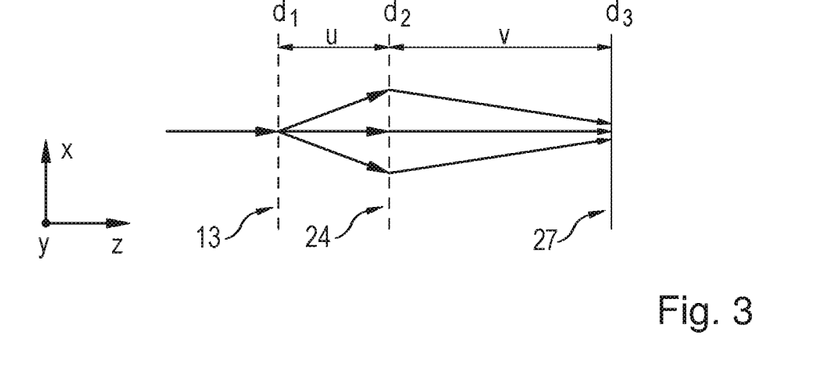
FIG. 3 is a schematic view of the beam path for generating incremental signals in the first exemplary embodiment, including relevant system parameters.

A first exemplary embodiment of the optical position-measuring device according to the present invention will now be described with reference to FIGS. 1, 2a-2c and 3. FIG. 1 shows a schematic cross-sectional view, FIGS. 2a-2c show top views of the material measure, the scanning reticle and the detector device, and FIG. 3 shows the beam path for generating incremental signals, including various relevant system parameters.

The optical position-measuring device illustrated in these figures includes a material measure 10 extending along a linear measurement directions and having an incremental graduation 13 as well as an absolute code 12. A scanning unit 20 is provided which is movable relative to material measure 10 along measurement direction x and has at least one light source 21, a scanning grating 24 disposed on a scanning reticle 23 and adapted for scanning incremental graduation 13, as well as a detector device 25. Detector device 25 includes an incremental detector 27 for generating incremental signals from the optical scanning of incremental graduation 13, as well as an absolute detector 26 for generating absolute signals from the optical scanning of absolute code 12. Incremental detector 27 and absolute detector 26 are disposed in scanning unit 20 in a common detection plane and placed together on a detector chip 25.1. In the illustrated exemplary embodiment, there is also schematically shown a control unit 30 which controls light source 21 as a function of the signal amplitudes of the incremental signals and in such a way that a predetermined signal amplitude is obtained for the incremental signals at all times. Accordingly, in the case of a reduced signal amplitude of the incremental signals, control unit 30 may, for example, increase the output intensity of the light source. Control unit 30 is preferably designed as an electronic circuit and also disposed in scanning unit 20. The one single light source 21 in the optical position-measuring device of the present invention serves to illuminate both incremental graduation 13 and absolute code 12 on material measure 10.

Material measure 10 and scanning unit 20 of the position-measuring device according to the present invention are typically connected to machine components that are movable relative to each other along measurement direction x. The absolute position of scanning unit 20 relative to material measure 10 along measurement direction x can be determined from the absolute and incremental signals generated by the optical position-measuring device and be fed to a machine control unit which uses it to control the motion of the movable machine components. As an alternative to transmitting the absolute position information to the machine control unit via, for example, a suitable serial data interface, it may, of course, also be provided to transmit the absolute and incremental signals generated by the inventive position-measuring device to the machine control unit, which then combines the transmitted absolute and incremental signals into an absolute position value.

In the illustrated first exemplary embodiment, the optical position-measuring device of the present invention is configured as a transmission-type system. The material measure 10 used is a transmission-type material measure composed of a material measure carrier 11, such as a glass plate, which is provided on one surface with two parallel tracks extending along measurement direction x and containing incremental graduation 13 and absolute code 13. Incremental graduation 13 and absolute code 13 each have alternately arranged regions 13a, 13b, respectively 12a, 12b, of different transmission characteristics; i.e., incremental graduation 13 and absolute code 13 are configured as amplitude gratings. In the present case, regions 12a, 13b (shown in black) are opaque and regions 12a, 13a (shown bright) are transparent.

In the exemplary embodiment shown, the generation of the absolute signals is accomplished by optically scanning absolute code 12 using a shadow-casting principle. In the process, absolute code 12, which is formed on material measure 10 as a pseudo-random code (PRC) having aperiodically arranged transparent and opaque regions 12a, 12b, is illuminated by a beam collimated by lens 22, and the structures or regions 12a, 12b of absolute code 12 are projected into the detection plane of absolute detector 26 without any optical imaging elements being interposed therebetween. After passage through absolute code 12 on material measure 10, the corresponding beams pass through a transparent window region 28 provided in scanning reticle 23 adjacent to scanning grating 24 in the y direction, and subsequently impinge on absolute detector 26 in the detection plane. As can be seen from FIG. 2c, absolute detector 26 is embodied as a line sensor or CCD array composed of a plurality of individual rectangular electro-optical detector elements 26.1-26.n arranged adjacent to each other in measurement direction x.

In the optical position-measuring device according to the present invention, the incremental signals from incremental graduation 13 are generated using a three-grating scanning principle, such as is known, for example, from the publication by R. Pettigrew entitled "Analysis of Grating Imaging and its Application to Displacement Metrology" in SPIE Vol. 36, $1^{st}$ European Congress on Optics Applied to Metrology (1977), pp. 325-33. In this connection, periodic incremental graduation 13 constitutes the first grating in the scanning beam path and is illuminated by the beam collimated by lens 22. Incremental graduation 13 has the grating period $d_1$, which represents the sum of the widths of successively arranged transparent and opaque incremental graduation regions 13a, 13b in measurement direction x. Scanning grating 24 in scanning unit 20 functions as the second illuminated grating in the scanning beam path and is spaced from incremental graduation 13 by a perpendicular distance u in the direction of beam propagation. Scanning grating 24, here configured as an amplitude grating, has the grating period $d_2$, which represents the sum of the widths of successively arranged transparent and opaque scanning grating regions 24a, 24b in scanning grating 24 in measurement direction x. Finally, the third and last grating in the incremental signal scanning beam path is incremental detector 27, which takes the form of a structured detector and is composed of a plurality of rectangular electro-optical detector elements 27.1-27.n arranged aperiodically along measurement direction x in the detection plane. Incremental detector 27 is spaced from scanning grating 24 by a perpendicular distance v in the direction of beam propagation.

In this scanning configuration, the interaction of the beam emitted by light source 21 with incremental graduation 13 and scanning grating 24 produces a periodic fringe pattern in the detection plane; i.e., on incremental detector 27, the fringe pattern having the periodicity $d_3$. The relationships between the periodicity $d_3$ of the fringe pattern and the other geometric system parameters of the inventive optical position-measuring device, as expressed in the following equations, are known from the above-mentioned publication.

$$d_3 = d_2 \cdot \frac{u+v}{u} \quad \text{(equation 1)}$$

$$d_1 = d_2 \cdot \frac{u+v}{v} \quad \text{(equation 2)}$$

where:
$d_1$:=grating period of the incremental graduation on the material measure
$d_2$:=grating period of the scanning grating $d_3$:=periodicity of the fringe pattern on the incremental detector v:=perpendicular distance between the scanning grating and the detection plane u:=perpendicular distance between the material measure and the scanning grating In the event of relative movement between material measure 10 and scanning unit 20 along measurement direction x, the generated fringe pattern moves across the incremental detector 27 in the detection plane. While this occurs, a plurality of mutually phase-shifted sinusoidal incremental signals can be generated in a known manner using the plurality of detector elements 27.1-27.n of incremental detector 27. These signals may be, for example, three incremental signals that are phase-shifted by 120° with respect to each other, or four incremental signals that are phase-shifted by 90° with respect to each other.

The high-resolution incremental signals generated in this way can then be arithmetically combined with the coarse-resolution absolute signals in a known manner to determine, for example, the absolute position of movable scanning unit 20 along measurement direction x.

In accordance with the present invention, it has been recognized that the sensitivity of the overall system is considerably affected in particular scattering contamination of certain components in the scanning beam path. The term "scattering contamination" as used herein is understood to refer to a contamination that causes the direction of light rays incident thereon to change, at least locally, from the initial direction. Such scattering contamination may occur, for example, only on material measure 10, only on scanning grating 24, or, in some instances, on both material measure 10 and scanning grating 24. The surfaces that are most susceptible to contamination are the two surfaces of material measure 10 as well as the side of scanning reticle 23 that is provided with scanning grating 24 and faces material measure 10. During operation, scattering contamination may be caused, for example, by liquid droplets accumulating on the surfaces of the aforementioned components, such as, for example, condensing coolant/lubricants, oil mists, etc., such as typically occur in the applications mentioned above.

In accordance with the present invention, the negative effect of such contamination on the scanning can be minimized by observing certain geometric conditions with respect to individual system parameters in the optical position-measuring device. This includes the selection of a defined perpendicular distance v between the detection plane and scanning grating 24 and/or the selection of a defined periodicity $d_3$ of the fringe pattern produced on incremental detector 17. In accordance with the present invention, perpendicular distance v and/or periodicity $d_3$ are/is selected such that, in the event of scattering contamination in the region of material measure 10 and/or scanning grating 24, the amplitudes of the incremental signals and the amplitudes of the absolute signals drop off equally. Accordingly, it is an aim of the present invention that the scattering contamination have substantially the same influence on both the incremental signals and the absolute signals. To this end, in accordance with the present invention, certain geometric system parameters must be selected differently than would be required by the corresponding theory regarding the generation of incremental signals and absolute signals. When light source control is used, the equal influence of the scattering contamination on both signals enables the corresponding control unit 30 to compensate the two signals equally. As a result, constant incremental and absolute signals are available even in the case of scattering contamination, and the availability of the inventive optical position-measuring device can thereby be significantly increased.

In this connection, it turned out that selecting the perpendicular distance v between scanning grating 24 and the detection plane in accordance with either of the two following relationships 3.1) and 3.2) is advantageous with respect to scattering contamination on material measure 10 and significantly improves the insensitivity to contamination of the overall system.

$$v = u \cdot \frac{\left(\frac{1}{d_1} - \frac{1}{2 \cdot d_{ABS}}\right)}{\left(\frac{1}{d_3} + \frac{1}{2 \cdot d_{ABS}}\right)} \pm 10\% \quad \text{(equation 3.1)}$$

$$v = u \cdot \frac{\left(\frac{1}{d_1} + \frac{1}{2 \cdot d_{ABS}}\right)}{\left(\frac{1}{d_3} - \frac{1}{2 \cdot d_{ABS}}\right)} \pm 10\% \quad \text{(equation 3.2)}$$

where:

v:=perpendicular distance between the scanning grating and the detection plane u:=perpendicular distance between the material measure and the scanning grating $d_1$:=grating period of the incremental graduation on the material measure $d_3$:=periodicity of the fringe pattern on the incremental detector $d_{ABS}$:=width of the smallest structure of the absolute code in the measurement direction.

The tolerance of about ±10% specified with respect to the ideal theoretical perpendicular distance v resulted from experiments. These experiments showed that by selecting perpendicular distance v in accordance with the present invention such that it is within a certain tolerance range around the ideal value, it is ensured, that in the event of scattering contamination, the response behavior is still of sufficient quality.

In a specific exemplary embodiment of the inventive optical position-measuring device, in which the system parameters are $d_1$=20 μm, $d_3$=80 μm, u=0.376 mm, $d_{ABS}$=210 μm and λ=850 nm, the optimized perpendicular distances v=1.203 mm±10% in accordance with equation 3.1) and v=1.946 mm±10% in accordance with equation 3.2) are obtained for an overall system that has a significantly increased insensitivity to contamination.

In the event of scattering contamination in the region of scanning grating 24, a significantly increased insensitivity to contamination can be attained in accordance with the present invention by selecting the periodicity $d_3$ of the fringe pattern on incremental detector 27 to be twice the width $d_{ABS}$ of the smallest structure of absolute code 12 along measurement direction x plus a certain tolerance; i.e., $$d_3 = 2 \cdot d_{ABS} \pm 10\% \quad \text{(equation 4)}$$

where:

$d_3$:=periodicity of the fringe pattern on the incremental detector $d_{ABS}$:=width of the smallest structure of the absolute code in the measurement direction.

In this case, provided the aforementioned condition 4) is met, the detection plane may be placed at any desired perpendicular distance v from scanning grating 24, yet the increased insensitivity to contamination is ensured. Based on the periodicity $d_3$ of the periodic fringe pattern on incremental detector 27 and the other system parameters u, $d_1$, parameter $d_2$ is determined using the above equations 1) and 2), and finally, perpendicular distance v is established based on equations 3.1)/3.2).

If scattering contamination is likely to occur both on material measure 10 and in the region of scanning grating 24, then, in accordance with the present invention, perpendicular distance v between scanning grating 24 and the detection plane is selected in accordance with the following equation $$v = \frac{1}{2} u \cdot d_3 \cdot \left( \frac{1}{d_1} - \frac{1}{d_{ABS}} \right) \pm 10\% \qquad \text{(equation 5)}$$

where:
v:=perpendicular distance between the scanning grating and the detection plane
u:=perpendicular distance between the material measure and the scanning grating
$d_1$:=grating period of the incremental graduation on the material measure
$d_3$:=periodicity of the fringe pattern on the incremental detector
$d_{ABS}$:=width of the smallest structure of the absolute code in the measurement direction.

In a specific exemplary embodiment of the inventive optical position-measuring device, in which the system parameters are $d_1$=20 μm, $d_3$=80 μm, u=0.376 mm, $d_{ABS}$=210 μm and λ=850 nm, the perpendicular distance v=0.716 mm±10% is obtained for an overall system that has a significantly increased insensitivity to contamination.

In practice, scanning grating 24 and/or the volume between scanning grating 24 and detectors 26, 27 can mostly be encapsulated very well; i.e., efficiently shielded from ambient influences. In contrast, material measure 10, particularly its rear side in the case of transmission-type systems, is unprotected, so that, for example, liquids condensing thereon in the form of droplets from a highly scattering film thereon. For such a type of scattering contamination, it is then advantageous, for example, to optimize the inventive optical position-measuring device in accordance with the above equations 3.1) or 3.2).

Furthermore, contamination on the unprotected side of scanning reticle 23 and the side of material measure 10 that faces scanning reticle 23 can be limited in practice by a very narrow scanning gap in the range of between 10-100 μm, preferably by a scanning gap of less than 50 μm. The term "scanning gap" as used herein is understood to refer to the space between the facing sides or bounding surfaces of material measure 10, on the one hand, and scanning unit 20, on the other hand. Then, only very small droplets may form in the scanning gap. On the opposite front side of material measure 10, which faces away from scanning unit 20, there is no such limitation. It is thus particularly advantageous to optimize the inventive optical position-measuring device in accordance with the relationships 3.1) or 3.2), respectively. In this manner, the overall system is at the same time also optimized with respect to contamination on the front side of material measure 10, so that the only remaining surface of increased susceptibility to contamination is the outwardly facing surface of scanning reticle 23.

Figure 4A:
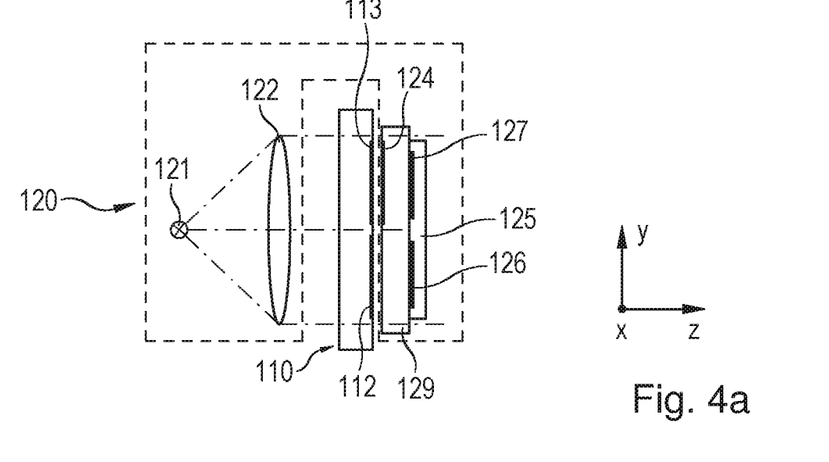
FIG. 4a is a schematic cross-sectional view of a second exemplary embodiment of the optical position-measuring device according to the present invention.
Figure 4B:
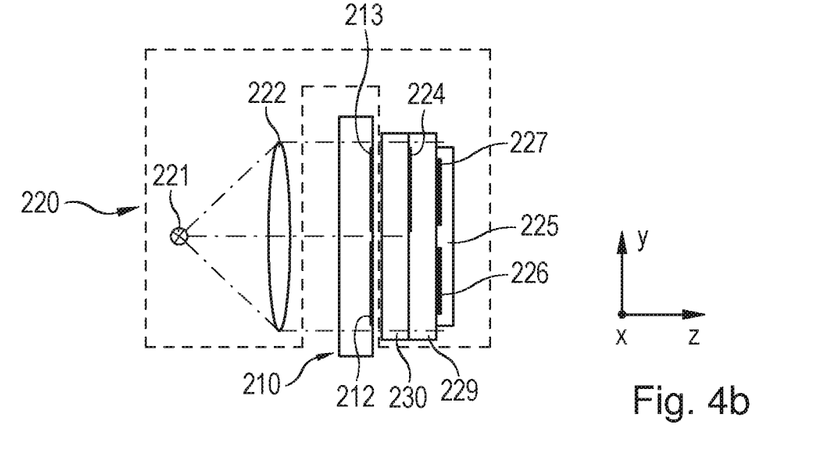
FIG. 4b is a schematic cross-sectional view of a third exemplary embodiment of the optical position-measuring device according to the present invention.

FIGS. 4a and 4b respectively show cross-sectional views of a second and a third embodiment of the inventive optical position-measuring device. In the following, only the relevant differences from the first exemplary embodiment will be described.

In the second exemplary embodiment of FIG. 4a, a transparent filler medium 129 having a refractive index of n>1 is disposed at least in a portion of the space between scanning grating 124 and detector device 127. Examples of a suitable filler medium 129 that may be used include, for example, glass or a transparent plastic material, which here is plate-shaped and disposed in the region between scanning grating 124 and detector device 127. Moreover, filler medium 129 may also include a plurality of materials, such as, for example, glass and a suitably selected adhesive layer. In the example shown, filler medium 129 fills this region completely. Here, scanning grating 124 is disposed on the side of filler medium 129 that faces material measure 110. Filler medium 129 makes it possible to very accurately set the perpendicular distance v between scanning grating 124 and detector device 127. In addition, it ensures that no condensing liquids may enter the region between scanning grating 124 and detector device 127, which could result in interference with the signal generation.

When such a filler medium 129 is provided in the region between scanning grating 124 and detector device 127, care must be taken to correct the perpendicular distance v to account for the refractive index n of filler medium 129 when using the above-described equations, because the path lengths traveled by the corresponding beams are then changed. This means that perpendicular distance v has to be replaced by the expression v/n in the respective equations mentioned above.

FIG. 4b illustrates a third exemplary embodiment, which is a modification of the previous second variant. In scanning unit 220, again, the space in front of detector device 227 is completely filled by a transparent plate-shaped filler medium which, in the present exemplary embodiment, is composed of the two glass plates 229, 230; however, scanning grating 224, which is configured as a phase grating or an amplitude grating, is now disposed within the filler medium and thereby protected from damage and contamination. Such amplitude and phase gratings may be disposed, for example, on glass plate 229, which functions as a carrier plate and is then adhesively bonded to the other glass plate 230. In addition, in this manner, a particularly small distance can be achieved between incremental graduation 213 disposed on material measure 210 and the boundary surface of scanning unit 220. This small distance makes it possible to flatten liquid droplets on the surface of material measure 10.

In addition to the exemplary embodiments specifically described herein, other embodiments are, of course, possible within the scope of the present invention.

For example, instead of disposing the incremental graduation and the absolute code in two separate tracks on the material measure as in the illustrated exemplary embodiment, it is also possible to integrate them in a common track that is illuminated by a single light source.

As an alternative to being configured as an amplitude grating or a phase grating having a phase deviation of 90°, the scanning grating may also be configured as a phase grating having a phase deviation of 180°. In the above-mentioned publication by R. Pettigrew regarding the scanning principle for generating incremental signals, this corresponds to the representation in the so-called "diffraction image." In this case, grating period $d_2$ must be replaced by ½ $d_2$ in relationships 1) and 2), while relationships 3.1), 3.2), 4) and 5) remain valid without any change.

Moreover, it is not absolutely necessary that the space between the scanning grating and the detector device in the scanning unit be completely filled by a transparent filler medium having a refractive index of n>1. It is also conceivable that this space may only be partially filled by a corresponding filler medium. In this case, however, it is advantageous to seal off air-filled spatial regions between the scanning grating and the detector device to prevent contamination in such regions.

Of course, both linear and rotary optical position-measuring devices can be configured in accordance with the present invention, etc.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An optical position-measuring device for absolute position determination, comprising:
    a material measure extending along a measurement direction and including at least one incremental graduation and an absolute code; and
    a scanning unit which is movable relative to the material measure along the measurement direction, the scanning unit having alight source, a scanning grating for optically scanning the incremental graduation and a detector device, the detector device including an incremental detector configured to generate incremental signals from the optical scanning of the incremental graduation and an absolute detector configured to generate absolute signals from optical scanning of the absolute code, the incremental detector and the absolute detector being disposed in a common detection plane, the detection plane being located at a defined perpendicular distance front the scanning grating and/or a periodicity of a fringe pattern on the incremental detector being selected such that, in the event of scattering contamination in a region of the material measure and/or the scanning grating, amplitudes of the incremental signals and amplitudes of the absolute signals drop off equally.

2. The optical position-measuring device as recited in claim 1, wherein the perpendicular distance between the scanning grating and the detection plane is selected either in accordance with:

$$v = u \cdot \frac{\left(\frac{1}{d_1} - \frac{1}{2 \cdot d_{ABS}}\right)}{\left(\frac{1}{d_3} + \frac{1}{2 \cdot d_{ABS}}\right)} \pm 10\%$$

or in accordance with:

$$v = u \cdot \frac{\left(\frac{1}{d_1} + \frac{1}{2 \cdot d_{ABS}}\right)}{\left(\frac{1}{d_3} - \frac{1}{2 \cdot d_{ABS}}\right)} \pm 10\%$$

where:
v=perpendicular distance between the scanning grating and the detection plane,
u=perpendicular distance between the material measure and the scanning grating,
$d_1$=grating period of the incremental graduation on the material measure,
$d_3$=periodicity of the fringe pattern on the incremental detector, and
$d_{ABS}$=width of the smallest structure of the absolute code in the measurement direction.

3. The optical position-measuring device as recited in claim 1, wherein the periodicity of the fringe pattern on the incremental detector is selected in accordance with $$d_3 = 2 \cdot d_{ABS} \pm 10\%$$

where:
$d_3$=periodicity of the fringe pattern on the incremental detector, and
$d_{ABS}$=width of the smallest structure of the absolute code in the measurement direction.

4. The optical position-measuring device as recited in claim 1, wherein the perpendicular distance between the scanning grating and the detection plane is selected in accordance with $$v = \frac{1}{2} u \cdot d_3 \cdot \left(\frac{1}{d_1} - \frac{1}{2 \cdot d_{ABS}}\right) \pm 10\%$$

where:
v=perpendicular distance between the scanning grating and the detection plane,
u=perpendicular distance between the material measure and the scanning grating,
$d_1$=grating period of the incremental graduation on the material measure,
$d_3$=periodicity of the fringe pattern on the incremental detector, and
$d_{ABS}$=width of the smallest structure of the absolute code in the measurement direction.

5. The optical position-measuring device as recited in claim 1, wherein the optical scanning of the incremental graduation is based on a three-grating scanning principle, and wherein a first illuminated grating in a scanning beam path is the incremental graduation, a second illuminated grating is the scanning grating and a third illuminated grating is the incremental detector, which is in a form of a structured detector.

6. The optical position-measuring device as recited in claim 1, wherein the optical scanning of the absolute code is based on a shadow-casting principle, and wherein structures of the absolute code are projected onto the absolute detector in the detection plane without any optical imaging elements being interposed therebetween.

7. The optical position-measuring device as recited in claim 6, wherein the absolute code is in a form of a pseudo-random code.

8. The optical position-measuring device as recited in claim 1, wherein the material measure is in a form of a transmission-type material measure, and wherein both the incremental graduation and the absolute code each have alternately arranged regions of different transmission characteristics.

9. The optical position-measuring device as recited in claim 1, wherein a scanning gap between the facing sides of the material measure and the scanning unit is less than or equal to 50 μm.

10. The optical position-measuring device as recited in claim 1, wherein the scanning unit includes a single light source configured to illuminate the incremental graduation and the absolute code.

11. The optical position-measuring device as recited in claim 1, further comprising a control unit configured to control an output intensity of the light source as a function of signal amplitudes of the periodic incremental signals in such away that a predetermined signal amplitude is obtained for the periodic incremental signals at all times.

12. The optical position-measuring device as recited in claim 1, wherein the incremental detector and the absolute detector are disposed together on a detector chip.

13. The optical position-measuring device as recited in claim 1, wherein a transparent filler medium having a refractive index of n>1 is disposed at least in a portion of a space between the scanning grating and the detector device.

14. The optical position-measuring device as recited in claim 1, wherein the scanning grating is disposed within the filler medium.

15. An method for absolute position determination using an optical position-measuring device, the method comprising:
providing the optical position-measuring device comprising:
a material measure extending along a measurement direction and including at least one incremental graduation and an absolute code, and
a scanning unit which is movable relative to the material measure along the measurement direction, the scanning unit having a light source, a scanning grating and a detector device;
optically scanning, using the scanning grating, the incremental graduation;
generating, using an incremental detector of the detector device, incremental signals from the optical scanning of the incremental graduation;
generating, using an absolute detector of the detector device, absolute signals from optical scanning of the absolute code,
wherein the incremental detector and the absolute detector are disposed in a common detection plane, and
wherein the detection plane is located at a defined perpendicular distance from the scanning grating and/or a periodicity of a fringe pattern on the incremental detector is selected such that, in the event of scattering contamination in a region of the material measure and/or the scanning grating, amplitudes of the incremental signals and amplitudes of the absolute signals drop off equally.

* * * * *